(12) United States Patent
Yoshikawa et al.

(10) Patent No.: US 9,423,095 B2
(45) Date of Patent: Aug. 23, 2016

(54) VEHICULAR LAMP

(71) Applicant: KOITO MANUFACTURING CO., LTD., Tokyo (JP)

(72) Inventors: Kazushi Yoshikawa, Shizuoka (JP); Tomokazu Suzuki, Shizuoka (JP); Takanori Namba, Shizuoka (JP); Toshiyuki Tsuchiya, Shizuoka (JP); Masato Watanabe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/185,554

(22) Filed: Feb. 20, 2014

(65) Prior Publication Data

US 2014/0241001 A1 Aug. 28, 2014

(30) Foreign Application Priority Data

Feb. 22, 2013 (JP) ................................. 2013-032863
Jul. 5, 2013 (JP) ................................. 2013-141902

(51) Int. Cl.
| | | |
|---|---|---|
| *F21V 29/00* | (2015.01) | |
| *F21S 8/10* | (2006.01) | |
| *F21V 29/503* | (2015.01) | |
| *F21V 29/60* | (2015.01) | |
| *F21V 29/89* | (2015.01) | |

(52) U.S. Cl.
CPC ................ *F21S 48/32* (2013.01); *F21S 48/31* (2013.01); *F21S 48/325* (2013.01); *F21V 29/503* (2015.01); *F21V 29/60* (2015.01); *F21V 29/89* (2015.01)

(58) Field of Classification Search
CPC ..... F21S 48/32; F21S 48/325; F21V 29/002; F21V 29/02; F21V 29/025; F21V 29/027; F21V 29/004
USPC ........................................ 362/247, 373, 294
See application file for complete search history.

(56) References Cited

U.S. PATENT DOCUMENTS

| | | | | |
|---|---|---|---|---|
| 6,635,999 | B2 * | 10/2003 | Belliveau ....................... | 315/149 |
| 7,015,470 | B2 * | 3/2006 | Faytlin et al. ................. | 250/330 |
| 7,040,762 | B2 * | 5/2006 | Yasuda .......................... | 353/52 |
| 7,654,696 | B2 * | 2/2010 | Pollmann-Retsch et al. .............................. | 362/294 |
| 8,070,324 | B2 * | 12/2011 | Kornitz et al. ................ | 362/294 |
| 2004/0105264 | A1 * | 6/2004 | Spero ............................ | 362/276 |
| 2005/0168990 | A1 * | 8/2005 | Nagata et al. ................. | 362/294 |
| 2005/0279949 | A1 * | 12/2005 | Oldham et al. ............ | 250/458.1 |
| 2006/0120084 | A1 * | 6/2006 | Sueoka ......................... | 362/294 |
| 2007/0273290 | A1 * | 11/2007 | Ashdown .............. | F21V 29/004 315/113 |
| 2011/0025485 | A1 * | 2/2011 | Kim et al. .................... | 340/438 |

FOREIGN PATENT DOCUMENTS

| | | |
|---|---|---|
| CN | 101144609 A | 3/2008 |
| CN | 101932166 A | 12/2010 |
| CN | 101938866 A | 1/2011 |
| CN | 101986023 A | 3/2011 |
| JP | 2010-153343 A | 7/2010 |
| JP | 2010-254099 A | 11/2010 |

OTHER PUBLICATIONS

Office Action issued on Mar. 15, 2016, by the State Intellectual Property Office of P.R. China in counterpart Chinese Application No. 201410056633.4.

* cited by examiner

*Primary Examiner* — Robert May
*Assistant Examiner* — Bryon T Gyllstrom
(74) *Attorney, Agent, or Firm* — Sughrue Mion, PLLC

(57) ABSTRACT

A vehicular lamp includes a light source, a cooling fan configured to cool the light source, a light source power supply module configured to drive the light source for emission of light, and a control module configured to execute an abnormal rotation detection of the cooling fan and to control the light source power supply module so that the quantity of light emitted from the light source is reduced in response to a detection of abnormal rotation.

7 Claims, 11 Drawing Sheets

VEHICULAR LAMP

CROSS-REFERENCE TO RELATED APPLICATION(S)

The present application claims the benefit of priorities of Japanese Patent Application No. 2013-032863 filed on Feb. 22, 2013 and Japanese Patent Application No. 2013-141902 filed on Jul. 5, 2013. The disclosures of the applications are incorporated herein by reference.

BACKGROUND

1. Technical Field

The present disclosure relates to a vehicular lamp with a cooling fan.

2. Related Art

Patent Literature

[Patent Literature 1] JP-A-2010-254099
[Patent Literature 2] JP-A-2010-153343

A vehicular lamp employs a semiconductor light emitting element such as an LED (Light Emitting Diode) for a light source. A heat dissipating plate (a heat sink) and a cooling fan are used as countermeasures against heat generated by the semiconductor light source.

Patent Literature 1 discloses a technique to stop the driving of a semiconductor light source when abnormality is detected in a cooling fan. Patent Literature 2 discloses a technique to detect abnormality in a cooling fan in an ensured fashion.

A heat sink is used to disperse heat generated by a semiconductor light source to thereby prevent an increase in temperature of the semiconductor light source and a reduction in light output thereof associated with the increase in temperature and further to prevent the deterioration and failure of the semiconductor light source. The cooling fan sends air to the heat sink to enhance the heat dispersion effect further. Consequently, providing the cooling fan can make the heat sink small in size, thereby making it possible to realize a reduction in weight of the vehicular lamp.

However, in the event that the heat sink is made small in size by the provision of the cooling fan, should the rotation speed of the cooling fan be reduced or the operation of the cooling fan be stopped due to the aged deterioration or failure of the cooling fan, the heat dispersing effect of the heat sink is reduced, which increases the accumulation of heat generated by the semiconductor light source, leading to a thermal failure of the semiconductor light source in the worst case.

Then, in Patent Literature 1, the thermal failure of the semiconductor light source can be avoided by turning off the semiconductor light source when abnormality is brought about in the cooling fan.

In a vehicular lamp, depending upon situations, it becomes inappropriate to turn off a light source. For example, when one of left and right headlamps of a motor vehicle is turned off due to abnormality being brought about in an associated cooling fan while the motor vehicle is being driven at night, the quantity of light illuminating the road ahead of the driver is reduced abruptly, whereby the physically relaxed driving situation is disrupted.

SUMMARY

Exemplary embodiments of the invention provide a vehicular lamp which can suppress the thermal failure of a semiconductor light source while considering the physically relaxed driving situation.

A vehicular lamp includes a light source, a cooling fan configured to cool the light source, a light source power supply module configured to drive the light source for emission of light, and a control module configured to execute an abnormal rotation detection of the cooling fan and to control the light source power supply module so that the quantity of light emitted from the light source is reduced in response to a detection of abnormal rotation.

With this, it is possible to suppress the heat generated in the light source by reducing the quantity of light emitted from the light source when the cooling fan rotates abnormally while maintaining the visibility as much as possible.

In the vehicular lamp, it is preferable that when detecting an abnormal rotation of the cooling fan, the control module controls the light source power supply module so that the quantity of light emitted from the light source module is reduced in accordance with a rotation speed of the cooling fan.

Namely, the quantity of light emitted from the light source is set in accordance with a degree at which the cooling capability of the cooling fan lowers.

In the vehicular lamp, it is preferable that when detecting an abnormal rotation of the cooling fan, the control module controls the light source power supply module so that the quantity of light emitted from the light source is reduced gradually.

This avoids a quick reduction in quantity of light.

In the vehicular lamp, it is preferable that the control module performs the abnormal rotation detection based on a rotation speed signal from the cooling fan and generates a substitute rotation speed signal which indicates a normal rotation speed, and when the input of the rotation speed signal is interrupted by a predetermined cause, the control module performs the abnormal rotation detection by using the substitute rotation speed signal as a substitute for the rotation speed signal from the cooling fan, preventing the interruption of the rotation speed signal from being detected as an abnormal rotation.

For example, when the rotation speed signal is not obtained due to the disconnection of the rotation speed signal line or disengagement of the wiring or when the rotation speed signal is not obtained due to the cooling fan being stopped based on the predetermined control, this fact of the rotation speed signal not being obtained is prevented from being detected as the abnormality of the cooling fan, thereby making it possible to avoid the execution of unnecessary light quantity reduction.

In the vehicular lamp, it is preferable that the control module performs the abnormal rotation detection based on a rotation speed signal from the cooling fan, the control module sets a predetermined period since activation of the cooling fan as a mask period during which the abnormal rotation detection based on the rotation speed signal is not performed, and the control module determines that the abnormal rotation occurs in the cooling fan when a state corresponding to an abnormal rotation continues for a predetermined length of time in the rotation speed signal in other periods than the mask period.

By setting the predetermined length of time since activation of the cooling fan as the mask period, the abnormal rotation of the cooling fan is prevented from being detected erroneously based on the change made by the temperature condition, for example, in the period to stabilization of the rotation of the cooling fan activated. In addition, by understanding that the abnormal rotation is taking place in the cooling fan in case where the state corresponding to the abnormal rotation continues for the predetermined length of time, an event of a temporary drop in rotation speed of the cooling fan is prevented from being detected as the abnormal rotation.

In the vehicular lamp, it is preferable that the control module changes a determination threshold which is used to detect an abnormal rotation of the cooling fan in accordance with temperature information.

The rotation speed of the cooling fan fluctuates according to the environmental temperatures, and the cooling capability (the air-blowing capability according to the rotation speed) required on the cooling fan also fluctuates depending on the environmental temperatures. Then, the determination threshold used to detect the abnormal rotation is changed in accordance with the temperature information.

In the vehicular lamp, it is preferable that t the control module changes a determination threshold which is used to detect an abnormal rotation of the cooling fan in accordance with information on a driving current which is supplied to the light source by the light source power supply module.

There may be a situation in which the driving current which is supplied to the light source module by the light source power supply module is changed by, for example, lighting modes (for example, a low beam mode, a high beam mode, and a DRL (Daytime Running Lamp) mode). The cooling capability (the air-blowing capability according to the rotation speed) required on the cooling fan also fluctuates depending upon the magnitude of the driving current. Then, the determination threshold used to detect the abnormal rotation is changed in accordance with the driving current information.

According to the invention, when the cooling fan rotates abnormally, it is possible to prevent the thermal failure of the light source by suppressing the generation of heat in the light source and to suppress the reduction in quantity of light in the field of vision by not turning off the light source.

DETAILED DESCRIPTION

Figure 1:
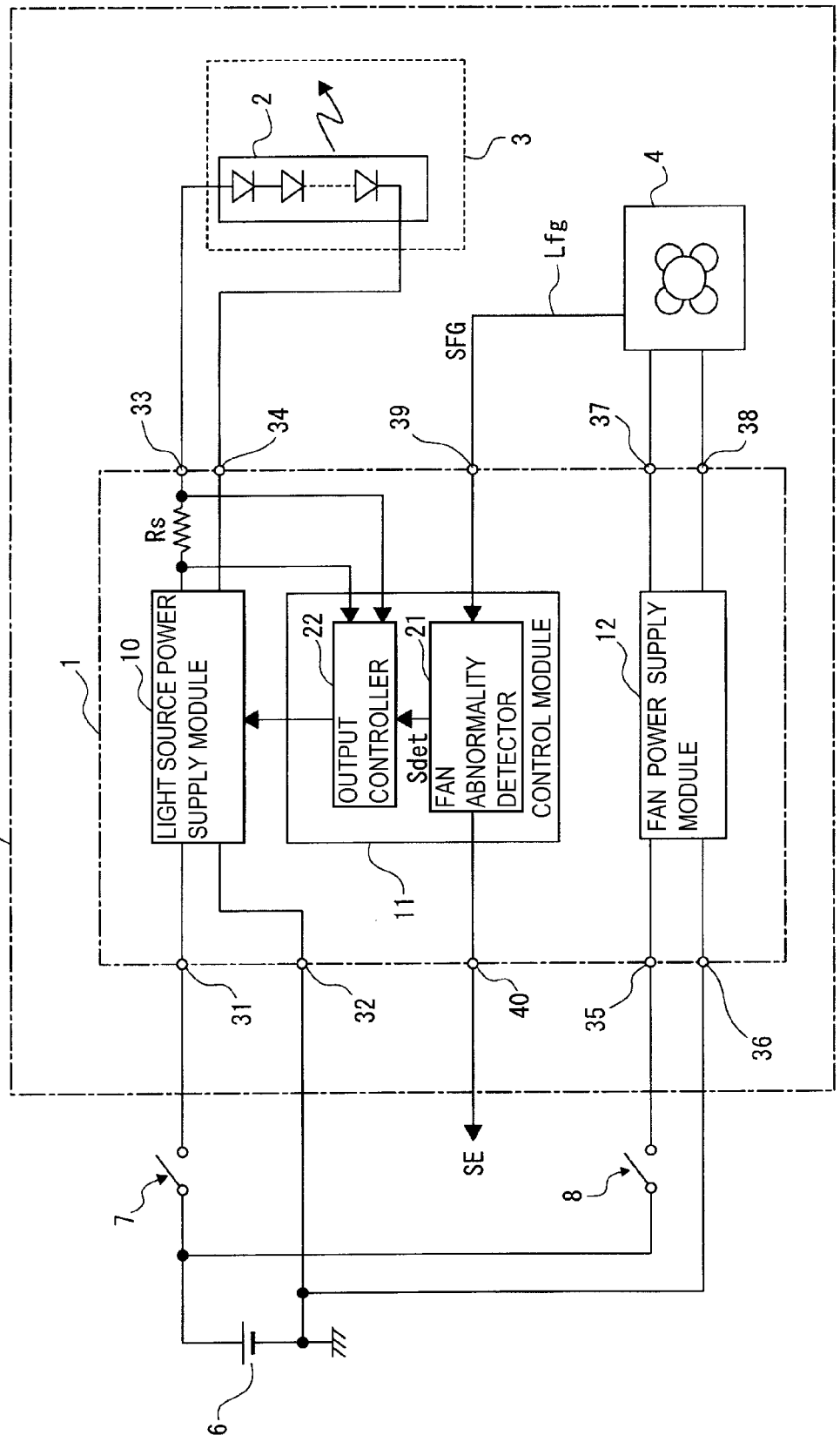
FIG. 1 is a block diagram of a vehicular lamp of a first embodiment.

Hereinafter, referring to the drawings, a vehicular lamp 100 according to the invention will be described based on embodiments thereof.

<1. First Embodiment>

FIG. 1 is a block diagram of a vehicular lamp 100 of a first embodiment. This vehicular lamp 100 has a lighting circuit section 1, a light source module 2, a heat sink 3, and a cooling fan 4. FIG. 1 also shows an onboard battery 6, a lighting switch 7, and a fan driving switch 8.

The light source module 2 emits light by employing, for example, one or a plurality of LEDs as a light source.

In the figure, the heat sink 3 is mounted as schematically indicated by a broken line as a countermeasure against heat generated in the light source module 2, so that heat generated in the light source module 2 is dissipated by the heat sink 3.

Similarly, the cooling fan 4 is provided as another countermeasure against heat generated in the light source module 2. The cooling fan 4 sends air to the heat sink 3 to thereby enhance the heat dissipating efficiency.

In the vehicular lamp 100, when the lighting switch 7 is switched on, the lighting circuit section 1 causes a light emission driving current to flow to the light source by using a direct current voltage from the onboard battery 6, whereby the light source module 2 is activated to emit light. Additionally, at least when the light source module 2 is activated to emit light, the cooling fan 4 is driven to rotate. Namely, the fan driving switch 8 is switched on in association with the light source module 2 being activated to emit light, whereby a fan motor rotation driving current is supplied to the cooling fan 4 by the lighting circuit section 1 by using the direct current voltage from the onboard battery 6.

A light source power supply module 10, a control module 11 and a fan power supply module 12 are provided as the lighting circuit section 1 which operates as described above.

The light source power supply module 10 is made up of, for example, a DC-DC converter as a switching regulator. An input side of the light source power supply module 10 is connected to a positive pole and a negative pole (ground) of the onboard battery 6 via terminals 31, 32. In addition, an output side of the light source power supply module 10 is connected to an anode terminal and a cathode terminal of one or a plurality of LEDs which make up the light source module 2 via terminals 33, 34. Namely, the light source power supply module 10 generates an output voltage to drive the light source module 2 for emission of light by raising or lowering a direct current voltage between the terminals 31, 32 and outputs the output voltage so generated to between the terminals 33, 34.

A resistance $R_S$ is a resistance for detecting the output voltage.

The control module 11 controls the switching operation of the light source power supply module 10. Further, in the case of this embodiment, the control module 11 detects abnormality in the cooling fan 4 and controls the output of the light source power supply module 10 so as to reduce the quantity of light of the light source module 2 according to the detected abnormality.

Because of this, the control module 11 includes a fan abnormality detector 21 and an output controller 22.

A rotation speed signal SFG indicating the rotation speed of the cooling fan 4 is inputted into the fan abnormality detector 21 via a terminal 39. The rotation speed signal SFG is a signal from an FG (Frequency Generator) which is attached to a fan motor, for example. As will be described later, the fan abnormality detector 21 determines whether or not the rotational operation of the cooling fan 4 is abnormal based on the rotation speed signal SFG and outputs an abnormality detection signal Sdet which indicates whether the cooling fan 4 rotates normally or abnormally to the output controller 22. The rotation speed signal SFG is a signal which is switched between H and L in synchronism with the rotation of the cooling fan 4. This rotation speed signal SFG is supplied to the fan abnormality detector 21 via a wiring Lfg.

In addition, when it detects that the cooling fan 4 rotates abnormally, the fan abnormality detector 21 outputs an abnormality informing signal SE from a terminal 40. The fan abnormality detector 21 outputs the abnormality informing signal SE to, for example, an electronic control unit (ECU), not shown.

The output controller 22 detects an output current based on voltages at both ends of the current detecting resistance $R_S$ and on/off controls a switching element of the light source power supply module 10 as a switching regulator according to the detected current for stabilization of the output current of the light source power supply module 10. Namely, the output controller 22 executes a duty control on an on/off control signal of the switching element. Further, when abnormality in fan rotation is detected by the abnormality detection signal Sdet, the output controller 22 controls the output of the light source power supply module 10 so as to reduce the quantity of light emitted from the light source module 2. For example, the output controller 22 reduces the quantity of the light emission driving current from the light source power supply module 10. Alternatively, in the case of pulse light emission, the output controller 22 performs an operation of reducing an average light emission driving current by controlling pulse duty and switching frequency.

With the fan driving switch 8 being on, an input side of the fan power supply module 12 is connected to the positive pole and the negative pole (ground) of the onboard battery 6 via terminals 35, 36. In addition, an output side of the fan power supply module 12 is connected to the cooling fan 4 via terminals 37, 38. Namely, the fan power supply module 12 generates a fan motor driving voltage from a direct current voltage between the terminals 35, 36 for rotational driving of the cooling fan 4.

It is noted that a configuration may be adopted in which electric power for the fan power supply module 12 is supplied from the ECU. Additionally, a configuration may be adopted in which the electric power is supplied from the output of the lighting switch 7. Namely, a configuration may also be adopted in which the lighting switch 7 doubles as the fan driving switch 8, and electric power is also supplied to the fan power supply module 12 in synchronism with supply of electric power to the light source power supply module 10.

Figure 2:
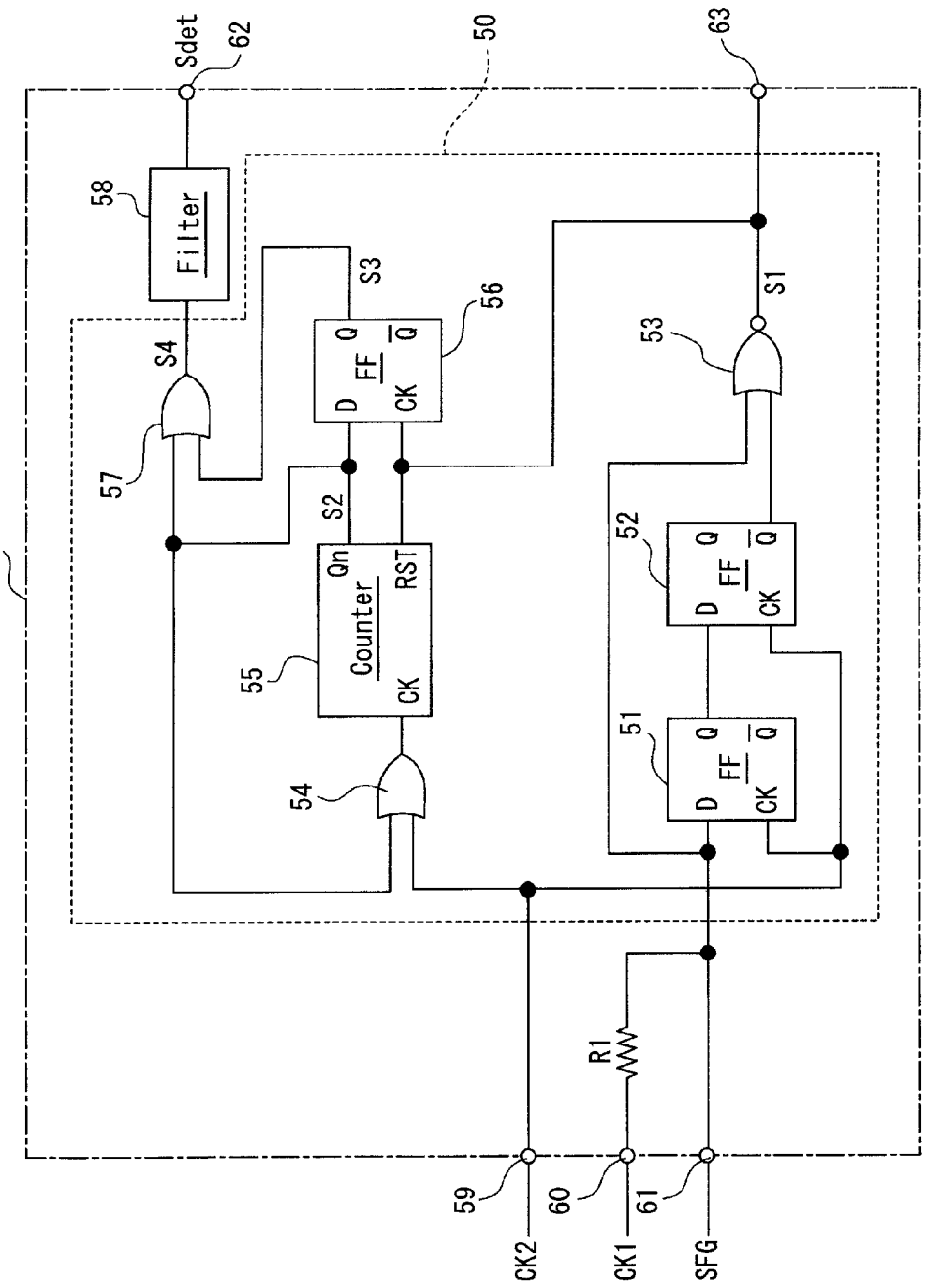
FIG. 2 is a block diagram of a fan abnormality detector of the first embodiment.
Figure 3:
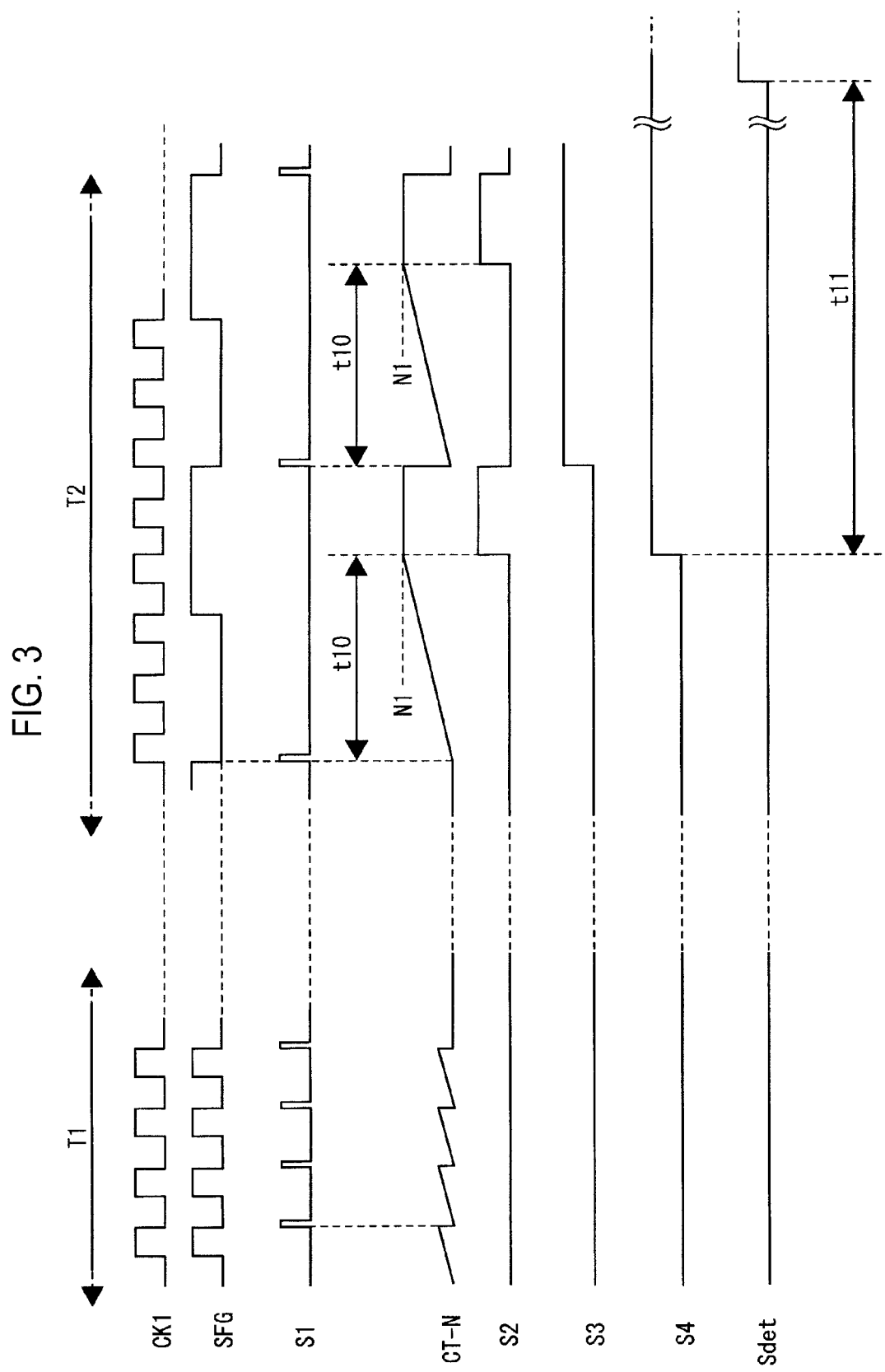
FIG. 3 is waveforms of constituent elements of the fan abnormality detector of the first embodiment.

FIGS. 2 and 3 show a specific example of the fan abnormality detector 21. FIG. 2 is a block diagram of the fan abnormality detector 21, and FIG. 3 shows waveforms of constituent elements of the fan abnormality detector 21 shown in FIG. 2.

As shown in FIG. 2, the fan abnormality detector 21 has a rotation speed detection circuit 50 which is surrounded by a broken line and a filter 58. The rotation speed detection circuit 50 includes, for example, D flip-flops 51, 52, 56, a NOR gate 53, a counter 55 and OR gates 54, 57. In this case, the rotation speed detection circuit 50 detects a rotation speed of the cooling fan from the rotation speed signal SFG and outputs a signal S4 which indicates that the rotation speed of the cooling fan becomes equal to or smaller than a predetermined rotation speed. The filter 58 processes the signal S4 to determine the continuity thereof and then outputs an abnormality detection signal Sdet.

The rotation speed signal SFG is inputted from a terminal 61 to a D terminal of the D flip-flop 51 and the NOR gate 53.

In addition, in a clock generation circuit, not shown, clocks CK1, CK2 are generated. Then, the clock CK1 of a predetermined frequency is inputted from a terminal 60 to be inputted into the D terminal of the D flip-flop 51 via a resistance 1 and the NOR gate 53.

Additionally, the clock CK2 is inputted from a terminal 59 to be supplied to CK terminals of the D flip-flops 51, 52, where the clock CK2 is used as a latch clock and is inputted into a CK terminal of the counter 55 via the OR gate 54, where the clock CK2 is used as a count clock.

The clock CK2 is a clock of a frequency in the range from, for example, several KHz to several tens of KHz, while the clock CK1 has a frequency which corresponds to a normal rotation speed of the cooling fan 4.

Here, firstly, it will be described that the rotation speed signal SFG and the clock CK1 are inputted into the D flip-flop 51. The clock CK1 which is generated by a clock generation circuit, which is not shown, functions as a substitute rotation speed signal.

FIG. 3 illustrates waveforms of the rotation speed signal SFG and the clock CK1. It is noted that a period T1 is a period during which the rotation speed of the cooling fan 4 is determined to stay in its normal range, and a period T2 is a period during which the rotation speed of the cooling fan 4 is determined to be abnormal.

Now, it is assumed that the rotation speed signal SFG resulting, for example, when the cooling fan 4 rotates normally (the period T1) is a signal of 120 Hz. Additionally, although this is an explanatory example to the end, it should be determined that the cooling fan 4 rotates abnormally in the event that the rotation speed signal SFG drops to, for example, 30 Hz or smaller.

On the other hand, it is assumed that the frequency of the clock CK1 is a frequency which corresponds to a normal rotation speed to the end and that the clock CK1 is a signal of a fixed frequency of 120 Hz, for example.

Consequently, when the cooling fan 4 rotates normally, both the rotation speed signal SFG and the clock CK1 are, for example, the signals of 120 Hz. When something wrong is caused to disrupt the rotational operation of the cooling fan 4, reducing the rotation speed thereof, although the frequency of the rotation speed signal SFG lowers, the clock CK1 remains unchanged.

Then, the rotation speed signal SFG changed and the clock CK1 remaining unchanged are both inputted into the D flip-flop 51 and the NOR gate 53.

However, the resistance RI is a high resistance. Due to this, even though the cooling fan 4 rotates normally or even though the cooling fan 4 rotates abnormally, reducing the frequency of the rotation speed signal SFG, there occurs a situation in which in the D flip-flop 51 and the NOR gate 53, the rotation speed signal SFG takes priority over the clock CK1, the clock CK1 being ignored.

On the other hand, the rotation speed signal SFG is supplied by the wiring Lfg shown in FIG. 1. When the wiring Lfg is disconnected or the wiring Lfg is disengaged from the terminal 39 at a connector portion, the terminal 39 side enters a high-impedance state, and therefore, the clock CK1 is inputted into the D flip-flop 51 and the NOR gate 53. Namely, the clock CK1 is used as a substitute for the rotation speed signal SFG which indicates that the cooling fan 4 operates normally.

In this way, when the rotation speed signal SFG is not supplied due to the wiring failure such as the disconnection of the wiring Lfg or the disengagement of the wiring Lfg from the connector, the clock CK1 is used as an input to detect abnormality. Moreover, this clock CK1 has the frequency which corresponds to the normal rotation speed, whereby the fan abnormality detector 21 shown in FIG. 2 is prevented from detecting the abnormal rotation of the cooling fan 4.

Following this, assuming that the wiring failure does not occur, operations will be described below which are to be performed in the circuit configuration shown in FIG. 2 in response to the input of the rotation speed signal SFG.

In the D flip-flop 51, the rotation speed signal SFG which is the D input is latched at the timing of a clock CK2 and becomes a Q output. This Q output becomes a D input of the D flip-flop 52. In the D flip-flop 52, the D input is latched at the timing of the clock CK2, and an inverted signal thereof becomes an inverted Q output ($\overline{Q}$ output). Consequently, the $\overline{Q}$ output is a signal in which the rotation speed signals SFG is delayed in the period of the clock CK2 and is inverted.

This $\overline{Q}$ output and the rotation speed signal SFG are inputted into the NOR gate 53, and therefore, a signal S1 which is an output of the NOR gate 53 becomes a falling edge detection signal of the rotation speed signal SFG as shown in FIG. 3.

The signal S1 from the NOR gate 53 is inputted into a reset terminal RST of the counter 55 and is also supplied to a CK terminal of the D flip-flop 56 to be used as a latch clock. Although a terminal 63 from which the signal S1 is outputted is shown in FIG. 2, this is a configuration which will be used in a second embodiment, which will be described later.

The clock CK2 is inputted into a CK terminal of the counter 55 via the OR gate 54. Consequently, the counter 55 performs an operation of counting the clock CK2 while a count value is rest at the timing of the signal S1. Them, when the count value becomes a predetermined value, a signal S2 is outputted from a Qn terminal.

A count value CT-N and the signal S2 are shown in FIG. 3. The count value CT-N in the figure shows how to count up the signal S2 with a count value represented along an axis of ordinates.

The count value is reset by the signal S1 before it reaches a predetermined value N1 in the period T1 where the cooling fan 4 rotates normally, and therefore, the signal S2 from the Qn terminal continues to stay at a level L.

However, when the rotation speed of the cooling fan 4 lowers, a period of time when the signal S1 stays at a level H becomes long, and therefore, the count value immediately before it is reset tends to become high.

In the period T2 when the cooling fan 4 is determined to rotate abnormally, even though the count value CT-N reaches the predetermined value N1, resetting does not take place. In response to this, the signal S2 enters a level H.

Namely, resetting does not take place for a predetermined period of time t10 or longer. In other words, the signal S2 enters the level H as a result of the frequency of the rotation speed signal SFG lowering to some specific frequency or smaller at which the period of the rotation speed signal SFG corresponds to the predetermined length of time t10.

Additionally, the other input of the OR gate 54 is the signal S2, and therefore, the input of the clock CK2 into a CK terminal of the counter 55 is masked at a point of time when the signal S2 stays at the level H, and the count value keeps the predetermined value N1. Thereafter, the count value is reset by the signal S1, whereby the signal S2 is switched to stay at the level L, and the counting of the clock CK2 is restarted.

The signal S2 from the counter 55 is inputted into a D terminal of the D flip-flop 56 and is also supplied to the OR gate 57.

Since the signal S1 is inputted into a CK terminal of the D flip-flop 56, the signal S2 is latched to a timing at which the counter 55 is reset. Consequently, a signal S3 which is a Q output of the D flip-flop 56 becomes as shown in FIG. 3. This signal S3 is also supplied to the OR gate 57.

Consequently, a signal S4 which is outputted from the OR gate 57 becomes a theoretical sum of the signals S2, S3.

After all, the signal S4 is a signal which detects that the frequency of the rotation speed signal SFG becomes the frequency at which the cooling fan 4 is determined to rotate abnormally. However, in order to avoid an erroneous determination of abnormal rotation of the cooling fan 4 as when the frequency of the rotation speed signal SFG drops temporarily, an abnormality detection signal Sdet is generated via the filter 58.

The filter 58 is made up of a counter. Alternatively, a shift register is used for the filter 58. The filter 58 outputs an abnormality detection signal Sdet when the signal S4 stays at a level H for a relatively long length of time. For example, a time during which the signal S4 stays at the level H is counted by a counter, for example. Then, when the time during which the signal S4 stays at the level H reaches a predetermined length of time t11 as shown in FIG. 3, the abnormality detection signal Sdet is switched to a level H. The predetermined length of time t11 should be set to, for example, something like 1 second to 60 seconds or some appropriate length of time which is longer than the aforesaid range.

The fan abnormality detector 21 generates the abnormality detection signal Sdet as described above, for example, and outputs it to the output controller 22.

When the abnormality detection signal Sdet is switched to the level H, the output controller 22 determines that the cooling fan 4 rotates abnormally and controls the output of the light source power supply module 10 so as to reduce the quantity of light emitted from the light source module 2.

Figure 4:
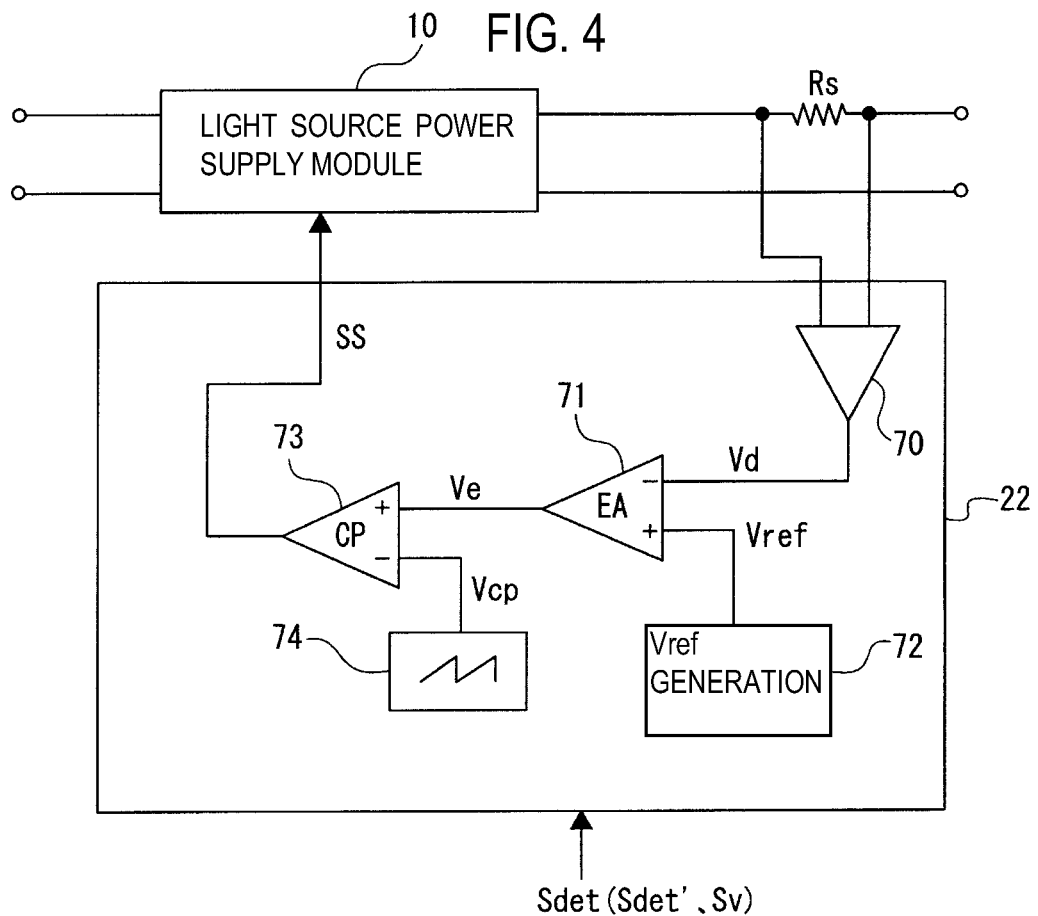
FIG. 4 is an explanation view of an example of an output control of the first embodiment.

An operation example of the output controller 22 will be described by reference to FIG. 4. FIG. 4 shows an example of a configuration for stabilizing the output of the output controller 22.

The output controller 22 is such that a voltage difference between ends of the current detecting resistance $R_S$ by a current detecting amplifier 70 to output a detection signal Vd which corresponds to the current value. A difference between the detection signal Vd and a reference voltage signal Vref which is generated in a reference voltage generator 72 is taken by an error amplifier 71 to thereby obtain an error signal Ve.

The error signal Ve is compared with a comparison signal Vcp which is generated in a comparison signal generator 74 by an error comparator 73. The comparison signal Vcp is a signal having a saw-tooth waveform. Because of this, a switching control signal SS of a pulse duty which corresponds to the quantity of error current is obtained from the error comparator 73. The switching element of the light source power supply module 10 (the switching regulator) is on/off controlled by this switching control signal SS, whereby the stabilization of output current can be realized.

When the output controller 22 adopts the output stabilizing configuration described above, a light quantity reduction control can be executed in response to detection of an abnormal rotation of the cooling fan 4 in the following approaches.

Firstly, it is considered that the output target value is reduced in response to input of the abnormality detection signal Sdet at the level H. Specifically, the reference voltage signal Vref generated in the reference voltage generator 72 is reduced. Alternatively, a negative offset is imparted to the comparison signal Vcp generated in the comparison signal generator 74.

Additionally, the detection value may be increased in response to input of the abnormality detection signal Sdet at the level H. For example, an offset is imparted to the detection signal Vd. Alternatively, an offset is imparted to the error signal Ve.

The approach described above is the example in which the output current of the light source power supply module 10 is reduced in a DC fashion. However, in the case of a PWM (Pulse Width Modulation) drive, an average current may be reduced.

For example, when the output voltage of the light source power supply module 10 is PWM controlled so that a certain driving current is caused to flow intermittently to the LEDs of the light source module 2 so as to blink at high speeds, the quantity of light emitted from the light source module 2 can also be reduced by changing the duty of a PWM signal which determines an on period and an off period. The light quantity control in response to input of the abnormality detection signal Sdet at the level H can be realized.

In this embodiment, as has been described heretofore, the control module 11 including the fan abnormality detector 21 and the output controller 22 detects the abnormal rotation of the cooling fan 4 and controls the output of the light source power supply module 10 so as to reduce the quantity of light emitted from the light source module 2 in response to detection of the abnormal rotation of the cooling fan 4.

Consequently, when the abnormal situation occurs in the cooling fan 4 in which the rotation speed thereof drops, the heat generation in the light source is suppressed by reducing the quantity of light emitted therefrom so as to prevent a thermal failure of the light source. In addition, the light source module 2 is not turned off but is controlled so as to reduce the quantity of light emitted therefrom, whereby no such situation is caused that the quantity of light in the field of vision of the driver is reduced largely, thereby making it possible to make a change in visibility small. Namely, the light emission control is realized which takes it into consideration to allow the driver to drive the vehicle in a physically relaxed driving condition.

In the embodiment described above, when the rotation speed signal SFG is not supplied due to the wiring failure such as the disconnection of the wiring Lfg or the disengagement of the wiring Lfg from the connector, the clock CK1 is used as the substitute rotation speed signal, whereby the abnormality detection signal Sdet is prevented from being switched to the level H. Namely, no light quantity reduction control takes place.

Namely, the control module 11 generates the substitute rotation speed signal which indicates that the cooling fan 4 rotates at normal rotation speeds. Then, when the input of the rotation speed signal is interrupted by the wiring failure, the abnormal rotation detection is executed by using the substitute rotation speed signal, whereby no abnormal rotation is detected, thereby making it possible to avoid a situation in which the quantity of light emitted from the light source module 2 is reduced not by the abnormal rotation of the cooling fan 4 but by the wiring failure. This is the operation performed to prevent the occurrence of a situation in which the quantity of light in the field of vision of the driver is reduced to an extreme extent and hence to maintain the physically relaxed driving condition for the driver. Thus, this is a preferred feature for the vehicular lamp.

Figure 5:
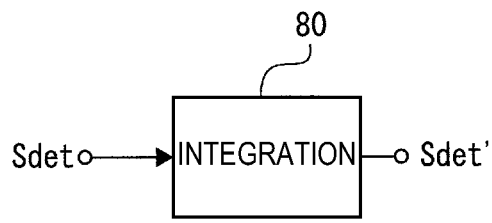
FIG. 5 is an explanation view of an integration process of the first embodiment.
Figure 5:
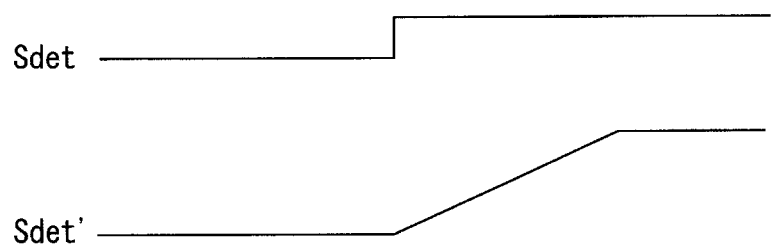

Incidentally, as a modified example of the first embodiment, as shown in FIG. 5, the fan abnormality detector 21 may adopt a configuration in which the abnormality detection signal Sdet is supplied to an integration circuit 80 to generate an abnormality detection signal Sdet' which is integrated in the direction of a time axis as shown in a lower part of FIG. 5 and the abnormality detection signal Sdet' is supplied to the output controller 22. The integration circuit 80 may be a general circuit which can be realized by a capacitor.

Then, the output controller 22 uses the abnormality detection signal Sdet' to execute a light quantity reduction control like the one described in FIG. 4. For example, according to this modified configuration, when an abnormal rotation is detected in the cooling fan 4, it is possible to control the output of the light source power supply module in such a way that the quantity of light emitted from the light source module 2 is gradually reduced to a predetermined level.

When the light source module is controlled to reduce the quantity of light emitted therefrom, if the quantity of light of the vehicular lamp is dropped abruptly, the driver may be forced to have difficulty in driving the vehicle. Therefore, the gradual reduction in quantity of light to the predetermined level prevents the driver from feeling a sensation of physical disorder while he or she is driving the vehicle and is suitable for maintenance of the physically relaxed driving condition.

In addition, although the fan abnormality detector 21 is described as outputting the abnormality informing signal SE in FIG. 1, the abnormality detection signal Sdet may be used alone or combined with other abnormality information for the abnormality informing signal SE.

Additionally, in the case of the configuration shown in FIG. 2, even though the abnormality detection signal Sdet is once switched to the level H (on), when the rotation speed of the cooling fan 4 returns thereafter to the normal ones, the abnormality detection signal Sdet is switched to the level L (off). Consequently, once the rotational speed of the cooling fan 4 returns to the normal state, the light source module 2 returns from the light quantity reduced state to the normal light emitting state.

However, a configuration may be adopted in which once the abnormality detection signal Sdet is on (the abnormal rotation of the cooling fan is detected), the control module 11 latches the abnormality detection signal Sdet and thereafter keeps the light quantity reduced state continuing as determining that the abnormal rotation still continues in the cooling fan.

<2. Second Embodiment>

Figure 6:
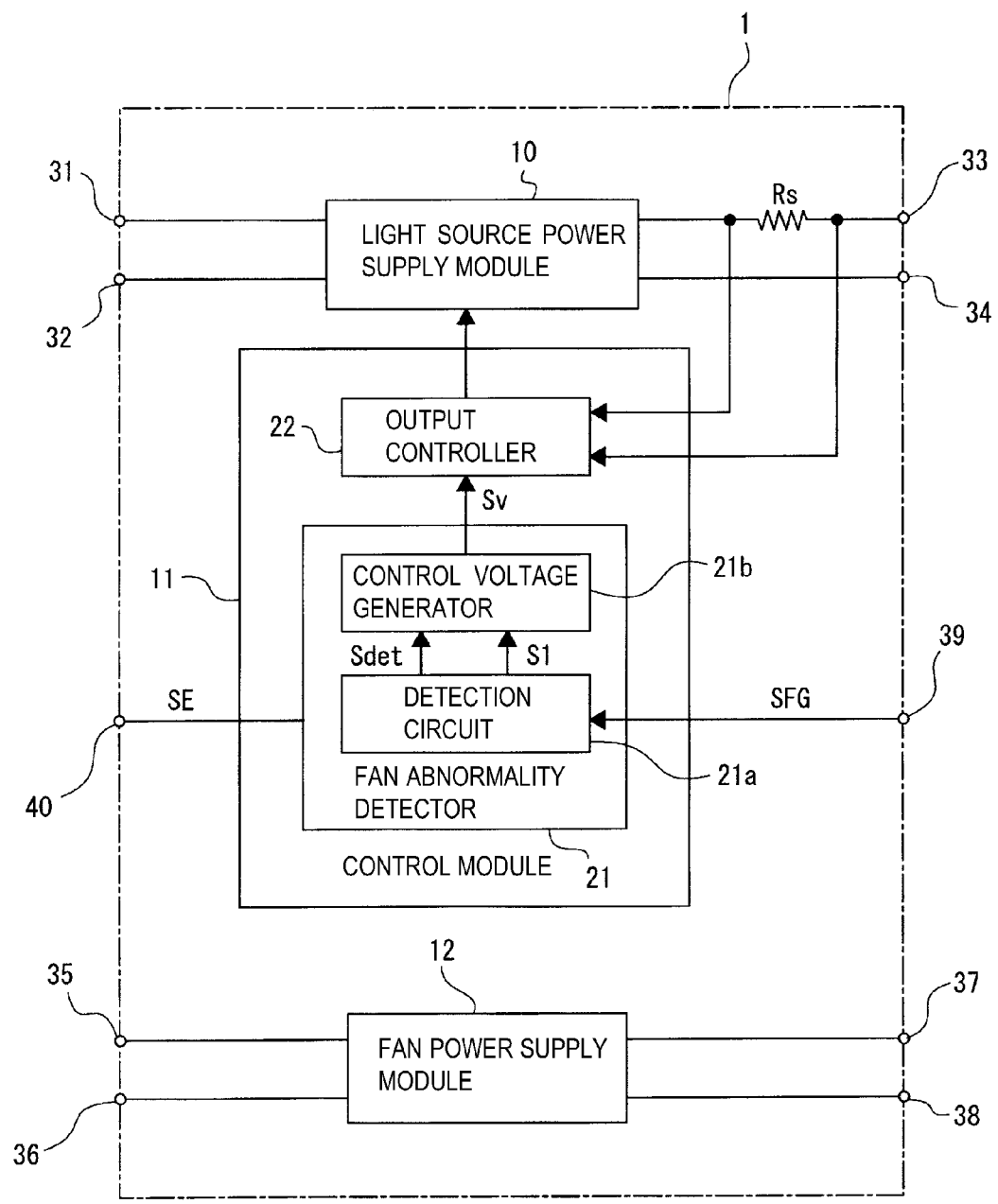
FIG. 6 is a block diagram of a vehicular lamp of a second embodiment.

Referring to FIGS. 6 to 9, a second embodiment will be described. FIG. 6 shows a lighting circuit section 1 of a second embodiment. The other configurations of the second embodiment remain the same as those shown in FIG. 1. In addition, also in the lighting circuit section 1, like reference numerals are given to constituent elements thereof which are like to those shown in FIG. 1, and the description thereof will be omitted here.

In the lighting circuit section 1 shown in FIG. 6, a fan abnormality detector 21 of a control module 11 has a detection circuit 21a and a control voltage generation circuit 21b.

A circuit configuration of the detection circuit 21a is the same as that shown in FIG. 2. Namely, the whole of the fan abnormality detector 21 of the first embodiment shown in FIG. 2 is referred to as the "detection circuit 21a" in the second embodiment. However, the detection circuit 21a has the terminal 63 described in FIG. 2 and outputs a signal Si from a NOR gate 53 to the control voltage generation circuit 21b. In addition, by performing the operations described in FIGS. 2, 3, the detection circuit 21a generates an abnormality detection signal Sdet and outputs it to the control voltage generation circuit 21b.

Figure 7:
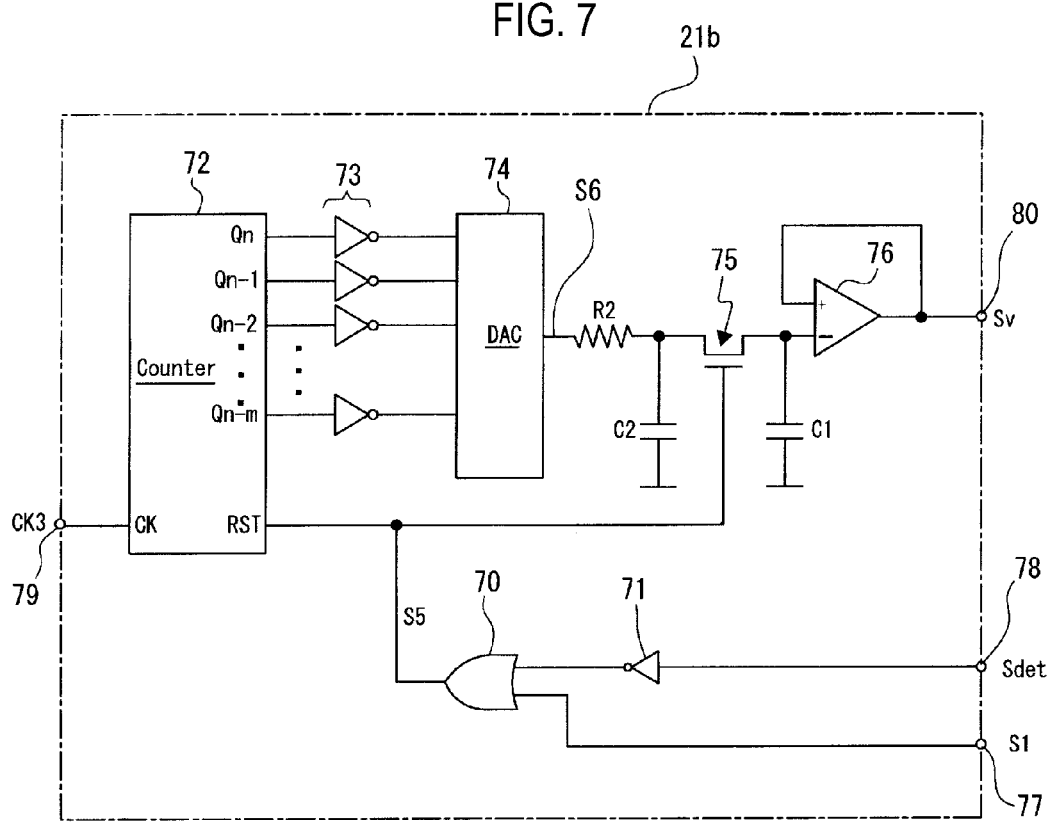
FIG. 7 is a block diagram of a control voltage generation circuit of the second embodiment.

FIG. 7 shows an example of a control voltage generation circuit 21b. Additionally, FIG. 9 shows waveforms of signals inputted into or outputted from constituent elements of the control voltage generation circuit 21b.

The control voltage generation circuit 21b is a circuit for generating as a control voltage Sv a signal which controls the output of a light source power supply module 10 so as to reduce the quantity of light emitted according to the rotation speed of a cooling fan 4 when abnormality is detected in the cooling fan 4.

A signal S1 from the detection circuit 21a is supplied to a terminal 77 of the control voltage generation circuit 21b and is then inputted into an OR gate 70. In addition, an abnormality detection signal Sdet from the detection circuit 21a is supplied to a terminal 78 and is then inverted in an inverter 71 to be inputted into the OR gate 70.

Figure 9:
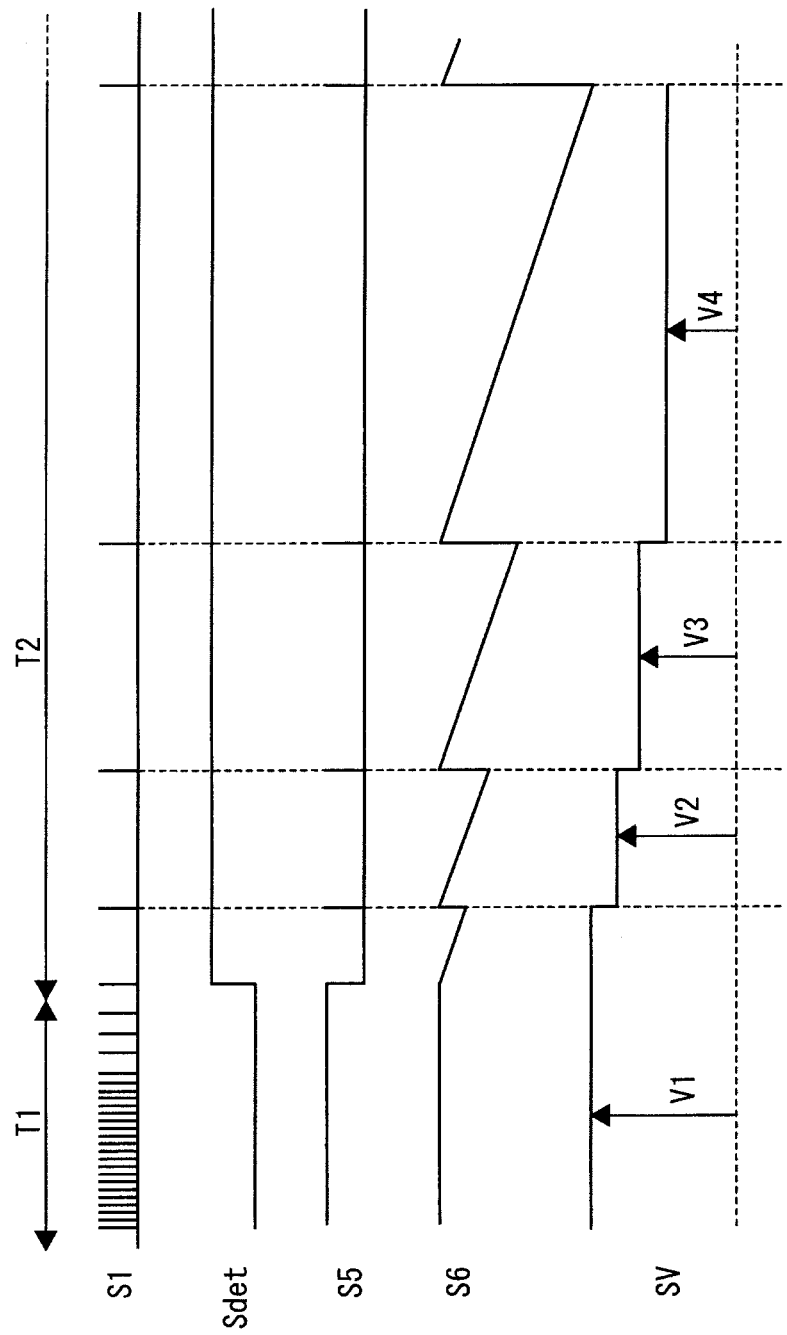
FIG. 9 is waveforms of signals inputted into or outputted from constituent elements of the control voltage generation circuit of the second embodiment.

FIG. 9 shows the signal S1, the abnormality detection signal Sdet and a signal S5 which is an output from the OR gate 70. As in FIG. 3, a period T1 is a period during which the cooling fan 4 rotates at rotational speeds which fall within a normal range, and a period T2 is a period during which the cooling fan 4 rotates abnormally.

In the period T1, the signal S1 which is an edge detection signal of a rotation speed signal SFG is switched to a level H at short intervals. As the rotation speed of the cooling fan 4 lowers, the intervals at which the signal S1 is switched to the level H become longer. When the intervals become long to some extent or larger, as described before, the abnormality detection signal Sdet is switched to a level H, whereby abnormality is detected in the cooling fan 4.

As shown in Fig. the signal S5, which is a theoretical sum of the abnormality detection signal Sdet which is inverted in the inverter 71 and the signal S1, continuously stays at the level H in the period T1 during which the cooling fan 4 rotates normally and is switched to the level H at intervals corresponding to the rotation speed of the cooling fan 4 in the period T2 during which the cooling fan 4 rotates abnormally.

The signal S5 is supplied to a reset terminal RST of a counter 72 and a gate of a switch element 75 (FET: Field Effect Transistor).

A counting clock CK3 is inputted into a terminal CK of the counter 72, and the counter 72 outputs count values Qn to Qn−m. In addition, since the counter 72 is reset by the signal S5, the counter 72 is in the reset state at all times in the period T1, and the count value remains 0. However, in the period T2 that the abnormal rotation is detected, the counter 72 executes counting up in a period which corresponds to the rotation speed of the cooling fan 4 (the intervals at which the signal S5 is switched to the level H).

The count values Qn to Qn−m are inverted individually in a group of inverters 73 and are converted to analog voltages in a D/A converter 74 to be outputted as a signal S6.

Consequently, as shown in FIG. 9, the signal S6 becomes a signal in which a maximum voltage value is produced when the count value is 0 and the voltage value lowers as the count value progresses.

The signal S6 is stabilized by a resistance R2 and a capacitor C2 and is supplied to one end of a capacitor C1 via between a source and a drain of the switch element 75. The switch element 75 and the capacitor C1 make up a sample holding circuit. A voltage value which is sample held is outputted from a terminal 80 to an output controller 22 via an output amplifier 76 as control voltage signal Sv.

The switch element 75 is switched on by the signal S5. Namely, the signal S6 is sampled when the signal S5 is switched to the level H and is then held by the capacitor C1.

Because of this, the control voltage signal Sv becomes as shown in FIG. 9. Namely, the control voltage signal Sv becomes some predetermined voltage V1 in the period T1 when the cooling fan 4 rotates normally, however, in the abnormal state where the cooling fan 4 rotates abnormally, the control voltage signal Sv takes lower voltage values (V2, V3, V4) as the rotation speed of the cooling fan 4 lowers.

Figure 8:
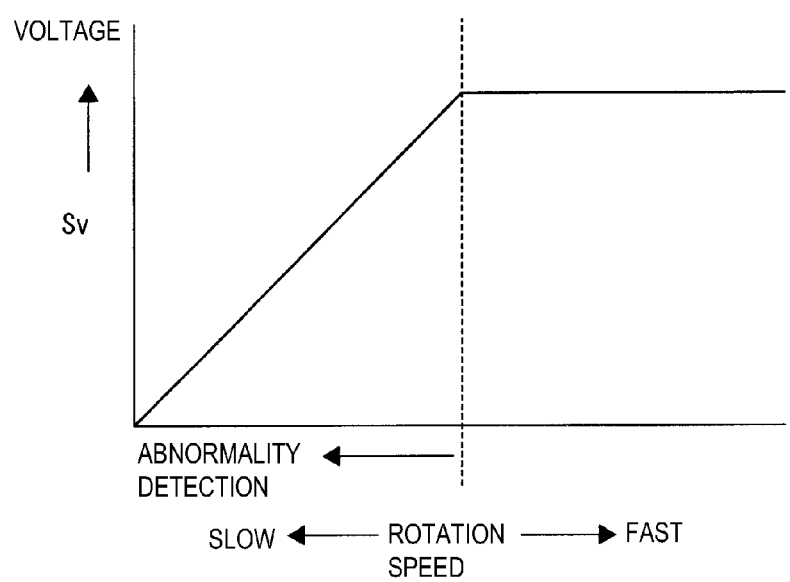
FIG. 8 is an explanation view of control voltage of the second embodiment.

FIG. 8 shows a relationship between the rotation speed of the cooling fan 4 and the control voltage signal Sv.

In this way, the control voltage generation circuit 21b generates the control voltage signal Sv which lowers in response to the reduction in rotation speed of the cooling fan 4 when it is detected that the cooling fan 4 rotates abnormally and supplies the control voltage signal Sv so generated to the output controller 22.

The output controller 22 controls the output of the light source power supply module 10 so that the light emitting operation of the light source module 2 is controlled to reduce the quantity of light emitted therefrom in accordance with the reduction in rotation speed of the cooling fan 4.

Previously, in the first embodiment, the output control approach taken by the output controller 22 is described in FIG. 4. It is considered that the same approach can be taken in this case.

For example, when the output controller 22 adopts an output stabilizing configuration like the one shown in FIG. 4, the control voltage signal Sv is supplied to the output controller 22. Then, it is considered that the output controller 22 lowers its output target value in accordance with the control voltage signal Sv. For example, the control voltage signal Sv itself or a voltage value which results from multiplying the control voltage signal Sv by a coefficient should be made a reference voltage signal Vref to be supplied to an error amplifier 71. Alternatively, the control voltage signal Sv is used as an offset which is imparted to a comparison signal Vcp in a comparison signal generator 74.

In addition, a detection value may be raised according to the control voltage signal Sv. For example, the control voltage signal Sv is added, for example, to a detection signal Vd or an error signal Ve.

By using these approaches, the output current of the light source supply module 10 is reduced in a DC fashion when it is detected that the cooling fan 4 rotates abnormally, whereby the quantity of light emitted from the light source module 2 can be reduced in accordance with the rotation speed of the cooling fan 4. Namely, the quantity of light reduced at the light source module 2 can be made large (the quantity of light emitted from the light source module 2 can be made small) by reducing a light emission driving current more as the rotation speed of the cooling fan 4 becomes slower.

In addition, when the output voltage of the light source power supply module 10 is PWM controlled so that a certain driving current is caused to flow intermittently to LEDs of the light source module 2 so as to blink at high speeds, the quantity of light emitted from the light source module 2 can also be reduced in accordance with the rotation speed of the cooling fan 4 by changing the duty of a PWM signal which determines an on period and an off period in accordance with the control voltage signal Sv. Namely, the quantity of light reduced at the light source module 2 can be made large (the quantity of light emitted from the light source module 2 can be made small) by reducing the light emission driving current averagely as the rotation speed of the cooling fan 4 becomes slower.

Thus, in the second embodiment, a similar advantage to that obtained in the first embodiment can be obtained. In addition to this, by reducing the quantity of light emitted from the light source module 2 in accordance with the rotation speed of the cooling fan 4 when it is determined that the cooling fan 4 rotates abnormally, the reduction in quantity of light emitted from the light source module 2 in a case where the cooling fan 4 rotates abnormally can be kept as small as possible. Additionally, by reducing the quantity of light emitted from the light source module 2 to such an extent that the occurrence of a problem can be prevented which could be caused by heat generated in the light source module 2, a thermal failure of the light source module 2 can be prevented. Thus, even though the cooling fan operates abnormally, the vehicular lamp still operates good enough to allow the driver to drive the vehicle in the physically relaxed driving condition.

As a modified example of the second embodiment, the fan abnormality detector 21 may adopt a configuration in which the control voltage signal Sv generated in the control voltage generating circuit 21b is integrated in an integration circuit and supplies the integrated signal to the output controller 22. Alternatively, the signal S6 shown in FIG. 9 may be supplied to the output controller 22 as the control voltage signal Sv.

By executing the light quantity reduction control described above by using the control voltage signal Sv, the output controller 22 can control the output of the light source power supply module so that the quantity of light emitted from the light source module 2 is reduced to a predetermined level when it is determined that the cooling fan 4 rotates abnormally. Thus, the quantity of light emitted from the light source module 2 is reduced gradually to the predetermined light quantity reduction level without causing the driver to feel the sensation of physical disorder, paying more attention to providing a more physically relaxed driving condition.

<3. Third Embodiment>

A third embodiment will be described by reference to FIG. 10. The third embodiment is intended to prevent in a fan abnormality detection the occurrence of an erroneous determination in which a normal cooling fan condition is determined as abnormal cooling fan condition or an abnormality determination in which a temporary drop in rotation speed of a cooling fan triggers a determination that the cooling fan rotates abnormally.

Figure 10:
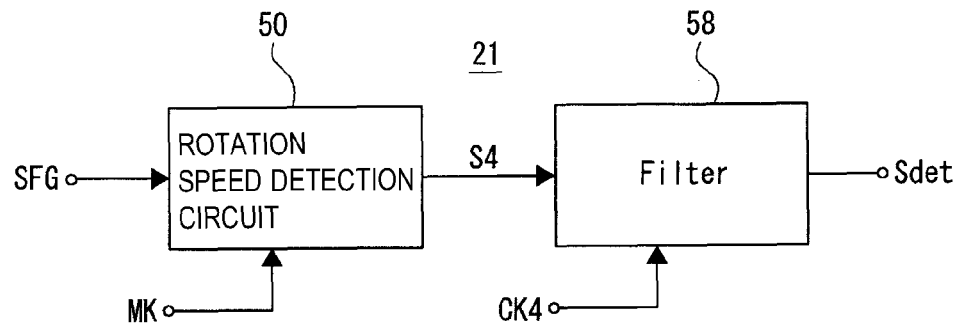
FIG. 10 is a block diagram of a fan abnormality detector of a third embodiment.

FIG. 10 shows a rotation speed detection circuit 50 and a filter 58 which are similar, for example, to those of the fan abnormality detector 21 shown in FIG. 1.

The rotation speed detection circuit 50 has a configuration like, for example, the one described in FIG. 2 and outputs a signal S4 which is switched to a level H in response to a reduction in rotation speed of a cooling fan 4. However, an abnormality detecting operation based on a rotation speed signal SFG is masked during a period when a mask signal MK which is inputted into a reset terminal RST stay at a level H, and the signal S4 outputs an L-level output at all times during the masked period. This configuration can be realized by adopting a configuration in which for example, in FIG. 2, the signal S1 and the mask signal MK are supplied to the reset terminal RST of the counter 55 via the OR gate.

The mask signal MK is held at the level H for a predetermined length of time (for example, two minutes) since the activation of the cooling fan 4, for example. Thereafter, the mask signal MK is switched to stay at a level L. Consequently, an abnormal determination based on the rotation speed signal SFG is executed in the rotation speed detection circuit 50. Because of this, as a result of the rotation speed of the cooling fan 4 becoming some determination threshold or lower, an H-level output of the signal S4 is executed.

The filter 58 counts an H-level period of the signal S4 by using, for example, a clock CK4 and outputs an abnormality detection signal Sdet which is switched to a level H when the H-level period continues a predetermined length of time. The clock CK2 in FIG. 2 or clocks of other frequencies may be used for the clock CK4.

In this way, the fan abnormality detector 21 shown in FIG. 10 detects the abnormal rotation of the cooling fan 4 based on the rotation speed signal SFG. The predetermined length of time since the activation of the cooling fan 4 is a mask period during which the abnormality detection based on the rotation speed signal SFG is not executed. For example, the time spent from the activation of the cooling fan 4 until the rotation thereof is stabilized varies depending upon the temperature characteristics of a ferrite magnet which makes up a fan motor or the viscosity of oil used which varies according to temperatures. In particular, in an extremely low temperature condition, quite long time (for example, one minute or longer) is necessary until the cooling fan 4 attains a stable rotation speed. Then, the mask period is set by the mask signal MK while taking into consideration a transition period of rotation of the cooling fan 4 from the start-up to the stable rotation thereof. This avoids a risk of an abnormality detection being executed immediately after the activation of the cooling fan 4 and at a point in time when the rotation speed of the cooling fan 4 has not yet arrived at the determination threshold. To make this happen, the mask period should be a period which is long enough to cover the transition period of rotation in any temperature environment. In the event that the mask period is set to, for example, two minutes, even though the transition period becomes quite long in an extremely low temperature condition such as −40° C., it can cover the transition period of rotation.

In addition, when a state in which the signal S4 is switched to stay at the level H as a state in the rotation speed signal SFG which indicates the occurrence of abnormal rotation in the cooling fan 4, that is, a state indicating a rotation speed which is equal to or smaller than the determination threshold continues for a predetermined length of time, the filter 58 outputs an abnormality detection signal Sdet which is at a level H which indicates the occurrence of abnormal rotation in the cooling fan 4.

Thus, the filter 58 prevents a reckless execution of abnormality detection (output of an H-level abnormality detection signal Sdet) as when the rotation speed drops momentarily below the determination threshold. This prevents a frequent change in detection results between abnormal and normal rotations. In addition, by detecting an abnormal rotation when it really takes place, the reliability in detecting an abnormal rotation can be enhanced.

When used with respect to the filter 58, the predetermined length of time may be something like several seconds including, for example, tow seconds to six seconds or one to two minutes.

It is noted that the predetermined length of time after which the filter 58 outputs the H-level abnormality detection signal Sdet is, for example, two minutes or the like, the filter 58 is allowed to have the function of the mask period which is set by the mask signal MK during the transition period of rotation of the cooling fan 4. Consequently, the prevention of erroneous detection when the cooling fan 4 is activated may be dealt with only by the function of the filter 58 without providing the mask period which is set by the mask signal MK. However, in this case, also when the cooling fan 4 rotates normally or when the rotation speed of the cooling fan 4 drops or the cooling fan 4 stops, the abnormal rotation of the cooling fan 4 is not detected until two minutes have elapsed. Then, the cooling effect on the light source module 2 is interrupted for two minutes. The period of two minutes during which the cooling effect is interrupted may be too long depending upon situations, leading to a danger of failure of the LEDs. Then, as shown in FIG. 10, the erroneous detection that would occur at the time of activation of the cooling fan 4 is prevented by the mask period set by the mask signal MK, and in other periods than the activation of the cooling fan 4 it is appropriate to improve the detection reliability by the filter 58 executing the determination on the abnormal rotation continuously for on the order of four seconds, for example.

<4. Fourth Embodiment>

Figure 11:
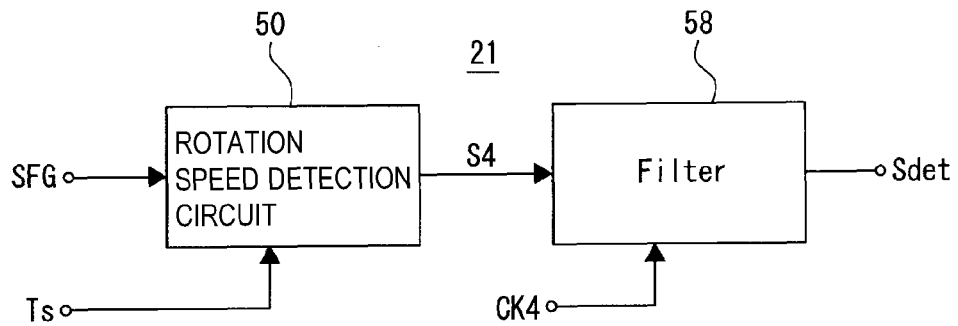
FIG. 11 is a block diagram of a fan abnormality detector of a fourth embodiment.

A fourth embodiment will be described by reference to FIGS. 11, 12. In this embodiment, a configuration is adopted in which temperature information Ts is inputted into a rotation speed detection circuit 50. When detecting from a rotation speed signal SFG that the rotation speed (the number of revolutions rpm) of a cooling fan 4 becomes equal to or smaller than a predetermined determination threshold, the rotation speed detection circuit 50 switches a signal S4 to a level H. When, for example, the signal S4 stays at the level H for a predetermined length of time such as four seconds or the like, a filter 58 determines that an abnormal rotation is occurring in the cooling fan 4 and then outputs an abnormality detection signal Sdet at a level H.

It is noted that the temperature information Ts may be detection information from a temperature detection circuit provided within a control module 11 (refer to FIG. 1) or detection information obtained in a temperature detection circuit provided outside the control module 11 which uses a thermistor or the like.

In this configuration, the rotation speed detection circuit 50 changes the determination threshold according to the temperature information Ts.

Figure 12:
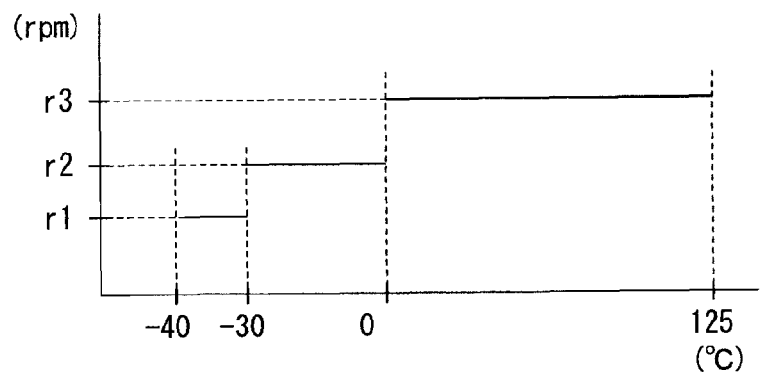
FIG. 12 is an explanation view of change of the threshold of the fan abnormality detector of the fourth embodiment.

For example, as shown in FIG. 12, as the determination threshold, a rotation speed of r3 (rpm) is used when the temperature is in the range from 0° C. to 125° C., a rotation speed of r2 (rpm) is used when the temperature is in the range from −30° C. to 0° C., and a rotation speed of r1 (rpm) is used when the temperature is in the range from −40° C. to −30° C. Thus, the rotation speed as the determination threshold lowers as the temperature of the environments reduces.

It is noted that in the configuration described in FIG. 2, reducing the determination threshold corresponds to increasing the predetermined value NI (refer to FIG. 3) in the counter 55.

In the low-temperature environment, the rotation speed of the cooling fan 4 which rotates at a constant speed also lowers due to the temperature characteristics of ferrite and a change in viscosity of oil used. Further, when the temperature of the environments is low, to begin with, a cooling effect can be obtained from the low-temperature environment, and therefore, the cooling effect by the cooling fan 4 does not have to be increased. In other words, there are many cases where even though the rotation speed of the cooling fan 4 lowers to thereby reduce the cooling effect thereof due to low temperatures, it is not necessary to detect the reduction in rotation speed of the cooling fan 4 as an abnormal rotation and hence, a control to reduce the driving current to a light source module 2 does not have to be performed.

Thus, judging from these circumstances, when temperatures are low, even though the rotation speed of the cooling fan 4 drops slightly, the drop in rotation speed should not be detected as an abnormal rotation. Then, the determination threshold is made to change in accordance with the temperature information Ts. This enables the execution of an abnormal rotation detection which matches the environment temperatures and prevents the execution of unnecessary abnormality detections.

<5. Fifth Embodiment>

Figure 13:
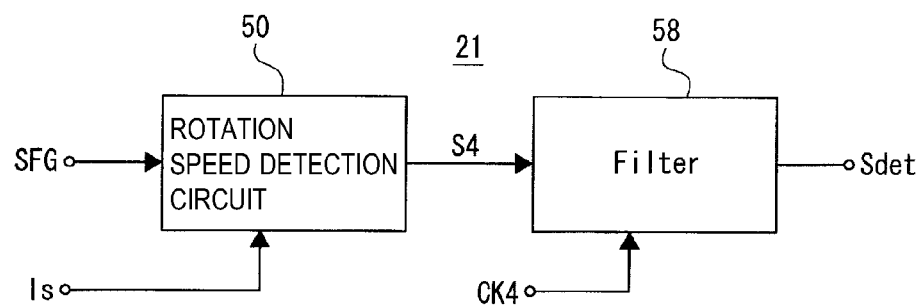
FIG. 13 is a block diagram of a fan abnormality detector of a fifth embodiment.

A fifth embodiment will be described by reference to FIGS. 13, 14. In this embodiment, a configuration is adopted in which driving current information Is is inputted into a rotation speed detection circuit 50. When detecting from a rotation speed signal SFG that the rotation speed (the number of revolutions rpm) of a cooling fan 4 becomes equal to or smaller than a predetermined determination threshold, the rotation speed detection circuit 50 switches a signal S4 to a level H. When, for example, the signal S4 stays at the level H for a predetermined length of time such as four seconds or the like, a filter 58 determines that an abnormal rotation is occurring in the cooling fan 4 and then outputs an abnormality detection signal Sdet at a level H.

The driving current information Is is information on a driving current value which a control module 11 indicates to a light source power supply module 10. For example, the control module 11 causes driving currents of different values to be outputted from the light source power supply module 10 based on lighting modes of a low beam, a high beam, and a DRL. In this case, information on lighting mode may constitute the driving current information Is.

Figure 14:
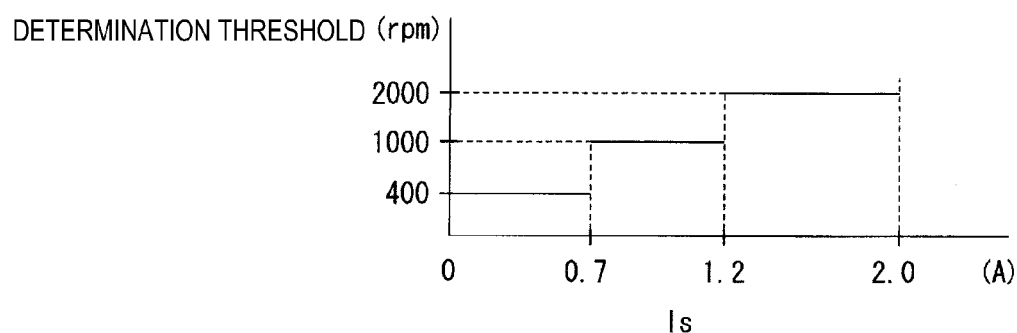
FIG. 14 is an explanation view of change of the threshold of the fan abnormality detector of the fifth embodiment.

Then, the rotation speed detection circuit 50 changes the determination threshold according to the driving current information Is as shown in FIG. 14. For example, let's assume that a driving current changes to 0.7 A for the DRL, 1.2 A for the low beam and 2.0 A for the high beam. In this case, for example, the determination threshold is set to 400 rpm when the DRL is used, 1000 rpm when the low beam is used and 2000 rpm when the high beam is used.

The heat value of a light source module 2 gets larger as the driving current gets higher. Consequently, it is necessary that the rotation speed of the cooling fan 4 is maintained as high as possible. However, the heat value of the light source module 2 is small during the DRL mode where the driving current is low, and a large capacity is not required on the cooling fan 4. In other words, even though the rotation speed of the cooling fan 4 drops to some extent, the necessity of detecting the drop in rotation speed as an abnormal rotation is low.

Then, when the driving current information Is informs of a high driving current value, the determination threshold is set to a high rotation speed, whereas when the driving current information Is informs of a low driving current value, the determination threshold is set to a low rotation speed. By setting the determination threshold in this way, it is possible to realize the prevention of execution of unnecessary abnormal rotation detections and hence the improvement in reliability in abnormal rotation detection.

Figure 15:
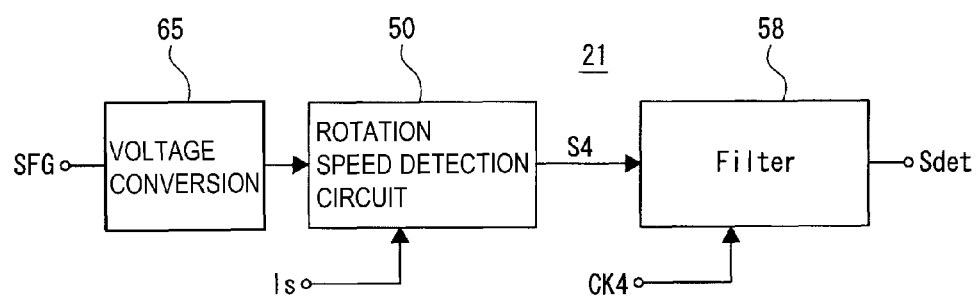
FIG. 15 is a block diagram of a modified example of a fan abnormality detector of the fifth embodiment.
Figure 16:
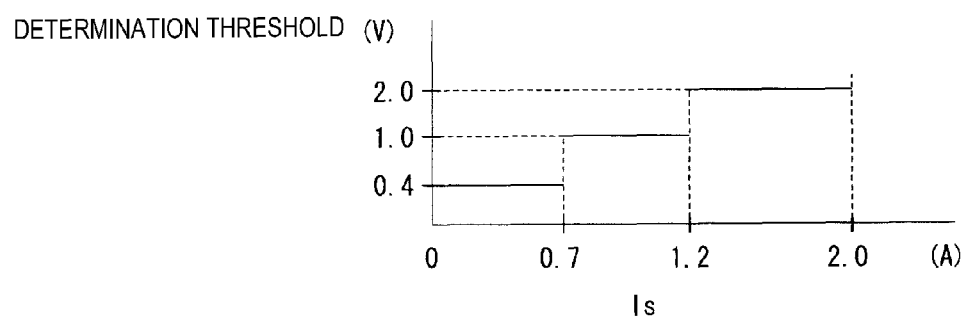
FIG. 16 is an explanation view of change of the threshold of the modified example of the fan abnormality detector of the fifth embodiment.

FIGS. 15 and 16 illustrate a modified example of the fifth embodiment. This modified example adopts a configuration in which a rotation speed signal SFG is converted to a voltage value in a voltage converter 65 and the converted voltage value is then supplied to a rotation speed detection circuit 50A.

The rotation speed detection circuit 50A detects a rotation speed of the cooling fan 4 based on the voltage value. Then, when detecting that the rotation speed of the cooling fan 4 becomes equal to or smaller than a predetermined threshold, the rotation speed detection circuit 50A switches a signal S4 to a level H. In addition, the rotation speed detection circuit 50A changes the set determination threshold as the current value in accordance with the driving current information Is. The other configurations are the same as those shown in FIG. 13.

FIG. 16 shows an example of setting of a determination threshold. For example, let's assume that the driving current is changed to 0.7 A for a DRL, 1.2 A for a low beam and 2.0 A for a high beam. The determination threshold is set to 0.4V (which is a voltage value corresponding to, for example, 400 rpm) when the DRL is used, 1.0V (which is a voltage value corresponding to, for example, 1000 rpm) when the low beam is used, and 2.0V (which is a voltage value corresponding to, for example, 2000 rpm) when the high beam is used.

In this case, too, an appropriate and highly reliable abnormal rotation detection can be executed in accordance with the lighting modes, for example.

Additionally, an example can be considered in which the determination threshold is change in consideration of both the temperature information Ts of the fourth embodiment and the driving current information Is of the fifth embodiment. This example includes a configuration in which determination thresholds are set in accordance with current values for each of temperature bands, for example.

<6. Sixth Embodiment>

A sixth embodiment will be described. The sixth embodiment constitutes an example in which when the rotation of a cooling fan 4 is stopped intentionally, this intentional stop is prevented from being erroneously determined as an abnormal rotation.

The first embodiment is described as constituting the example in which when the wiring failure occurs in the wiring Lfg of the rotation speed signal SFG, the abnormality detection is not executed. On the other hand, the sixth embodiment constitutes the example in which when a rotation speed signal SFG is interrupted by execution of a fan rotation stop control, an abnormality detection is not executed. The sixth embodiment also constitutes the example in which when a disconnection of a driving power supply line and a rotation speed signal SFG line, a short circuit of the driving power supply line and the rotation speed signal line or a short circuit between the driving power supply line and the rotation speed signal line and a ground line or a case earth takes place, the disconnection or the short circuit is determined as an abnormal rotation of a cooling fan 4.

Figure 17:
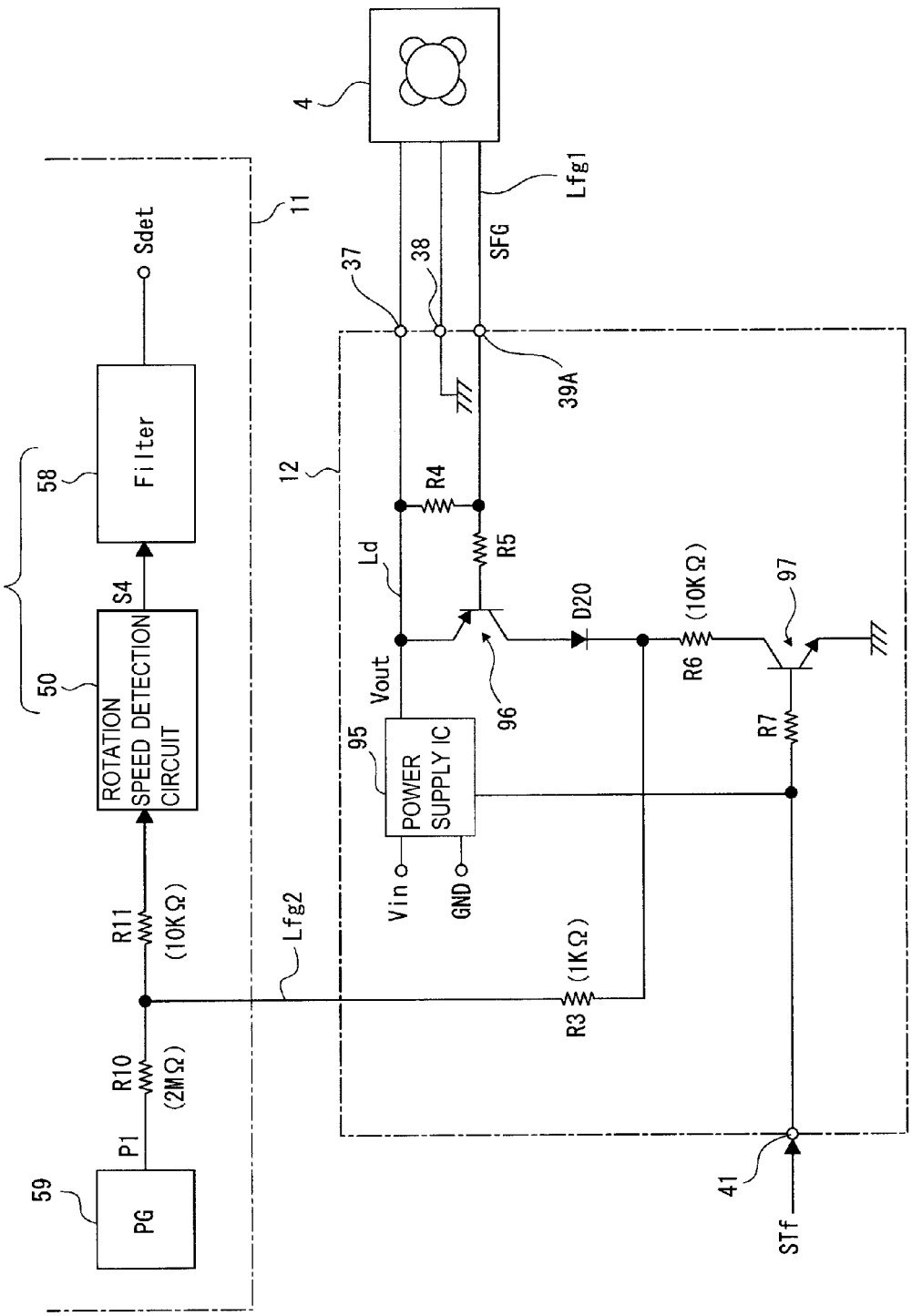
FIG. 17 is a block diagram of a six embodiment.

FIG. 17 shows the periphery of a fan abnormality detector 21 provided inside a control module 11 as shown in FIG. 1, a fan power supply module 12 and a cooling fan 4.

A power supply line and a ground line of the cooling fan 4 are connected to the fan power supply module 12 via terminals 37, 38, whereby a fan driving power supply is supplied to the cooling fan 4.

A configuration shown in FIG. 17 is different from the configuration shown in FIG. 1 in that a wiring Lfg1 is connected to a terminal 39A so that a rotation speed signal SFG from the cooling fan 4 is supplied to the fan power supply module 12 and the rotation speed signal SFG is then supplied from the fan power supply module 12 to a control module 11 by a wiring Lfg2.

In the control module 11, as with the embodiments which have been described above, a fan abnormality detector 21 has a rotation speed detection circuit 50 and a filter 58.

In addition, the control module 11 includes a pulse generator 59. This pulse generator 59 generates a pulse signal P1 as a substitute rotation speed signal. The pulse signal P1 is a signal similar to the clock CK described in FIG. 3 whose frequency corresponds to the normal rotation speed. The pulse signal P1 is designed to be supplied to the rotation speed detection circuit 50 via a resistance R10 (of two MΩ for example) and a resistance R11 (of 10 kω, for example).

On the other hand, the rotation speed signal SFG is supplied to a connecting point between the resistances R10, R11 via a resistance R3 (of 1 kΩ, for example) by the wiring Lfg2 and is supplied to the rotation speed detection circuit 50 via the resistance 11. Basically, due to the resistance R10 being a high resistance of 2 MΩ, for example, not the pulse signal P1 but the rotation speed signal SFG is inputted into the rotation speed detection circuit 50. The rotation speed detection circuit 50 detects from the rotation speed signal SFG whether or not the rotation speed of the cooling fan 4 becomes equal to or smaller than a determination threshold and switches a signal S4 to a level H when the rotation speed becomes equal to or smaller than the determination threshold. Determining that an abnormal rotation is taking place in the cooling fan 4 in case the signal S4 continuously stays at the level H for a predetermined length of time such as four seconds or the like, the filter 58 outputs an abnormality detection signal Sdet at a level H.

The fan power supply module 12 includes a power supply IC 95. A fan driving power supply voltage is applied to a Yin terminal and a GND terminal of the power supply IC 95. Then, the power supply IC 95 generates a fan motor driving voltage Vout from the fan driving power supply voltage and outputs it to a driving power supply line Ld (the terminal 37).

In addition, the fan power supply module 12 has a PNP transistor 96, a NPN transistor 97, a diode D20 and resistors R3 to R7. An emitter of the PNP transistor 96 is connected to the driving power supply line Ld, a collector is connected an anode of the diode D20 and a base is connected to the terminal 39A (the wiring Lfg1) via the resistor R5. The resistor R4 is connected to between the terminals 37 and 39A.

A cathode of the diode D20 is connected to a collector of the NPN transistor 97 via the resistor R6 (of 10 kΩ, for example). An emitter of the NPN transistor 97 is grounded, and a base is connected to a terminal 41 via the resistor R7.

A connecting point between the diode D20 and the resistance R6 is connected to the wiring Lfg2 via the resistance R3.

A fan stop signal STf is supplied from, for example, an ECU, not shown, to the terminal 41. It is noted that with a control specification which stops the cooling fan 4 when a DRL, for example, is lit, a DRL lighting mode indication signal may be used to generate a fan stop signal STf.

The fan stop signal STf is supplied to the power supply IC 95 and the base of the NPN transistor 97. The fan stop signal STf is a signal which indicates a "fan drive" when it is at a level H and indicates a "fan stop" when it is at a level L. When the fan stop signal STf=L, the power supply IC 95 stops the output of the driving voltage Vout so as to stop the rotation of the cooling fan 4.

With this configuration, the following operations are executed.

Rotational Driving of the Cooling Fan 4

When the fan stop signal STf=Level H, the power supply IC 95 outputs the driving voltage Vout so as to drive the cooling fan 4 so that the cooling fan 4 is rotated. In this case, the PNP transistor 96 and the NPN transistor 97 are switched on. The rotation speed signal SFG from the wiring Lfg1 is supplied to the control module 11 via the PNP transistor 96, the diode D20 and the resistance R3 by the wiring Lfg2. Since the pulse generator 59 side is put in a high impedance state by the resistance R10, the pulse signal P1 is not effective, and therefore, the rotation speed signal SFG supplied from the wiring Lfg2 is inputted into the rotation speed detection circuit 50. Consequently, it is determined based on the rotation speed signal SFG whether the cooling fan 4 rotates normally or abnormally.

Intentional Stopping of the Cooling Fan 4

When a vehicular lamp is lit by reducing a light emission driving current as when the DRL, for example, is lit, since only a small quantity of heat is generated in a light source module 2, it is assumed that there may be a situation where the cooling fan 4 is stopped. Then, when the DRL is lit, for example, the ECU switches the fan stop signal STf to the level L so as to stop the rotation of the cooling fan 4.

In this case, when the fan stop signal STf=the level L, this triggers the stop of outputting the driving voltage Vout by the power supply IC 95. The rotation speed signal SFG is also stopped by the rotation of the cooling fan 4 being stopped. Then, the PNP transistor 96 is switched off. In addition, the NPN transistor 97 is also switched off by the fan stop signal STf. Then, since the wiring Lfg2 is opened when looking at from the fan abnormality detector 21 side, the pulse signal P1 from the pulse generator 59 which is connected therewith by the resistance R10 in a high impedance state is inputted into the rotation speed detection circuit 50 as a substitute rotation speed signal. Since the pulse signal P1 is a frequency signal corresponding to the normal rotation speed of the cooling fan 4, even though the cooling fan 4 is stopped, the fan abnormality detector 21 does not detect this as abnormality (an abnormality detection signal Sdet=H is not established).

Short Circuit and Opening during Rotational Driving of Cooling Fan 4

Firstly, when a short circuit takes place at the ground of the driving power supply line Ld, the PNP transistor 96 is switched off. On the other hand, the NPN transistor 97 is switched on. Due to the short circuit of the ground of the driving power supply line Ld, the cooling fan 4 does not operate normally, and hence, the rotation speed signal SFG indicates that abnormality is taking place in the cooling fan 4. The NPN transistor 97 is on, and when looking at from the fan abnormality detector 21, the wiring Lfg2 side is grounded via the resistance R6 and hence is not opened. Because of this, the pulse generator 59 side via the resistance R10 is in a high impedance state, and hence, the pulse signal P1 does not constitute an effective input. Consequently, the rotation speed signal SFG which indicates the abnormality of the cooling fan 4 is inputted into the rotation speed detection circuit 50, whereby an abnormality detection (the abnormality signal Sdet=H) is executed by the fan abnormality detector 21.

This will be true when the driving power supply line Ld or the wiring Lfg 1 short-circuits. Further, this will also be true when a short circuit takes place between the wiring Lfg1 and the ground.

In addition, also when any of the driving power supply line Ld (the terminal 37), the wiring Lfg1 (the terminal 39A) and the ground line (the terminal 38) is opened, the PNP transistor 96 is off, while the NPN transistor 97 is on, whereby an abnormality detection is executed in a similar fashion to what is described above.

As has been described above, in the sixth embodiment, when the vehicular lamp is lit by reducing the light emission driving current as when the DRL, for example, is lit, since only a small quantity of heat is generated in a light source module 2, the cooling fan 4 is stopped. Thus, by stopping the cooling fan 4 in this way, the life of the cooling fan 4 can be extended.

However, in this case, the rotation speed signal SFG is also stopped due to the cooling fan 4 being stopped. On the other hand, when the driving power supply line Ld or the wiring Lfg1 which is the rotation speed signal SFG line is disconnected or short-circuited, it is not possible to generate the rotation speed signal SFG as when the cooling fan 4 is stopped. Unless these cases are discriminated from each other, the failure of the cooling fan 4 cannot be determined when the short circuit or disconnection of the lines concerned takes place.

Then, in this embodiment, when the rotation speed signal SFG is not supplied due to the cooling fan 4 being stopped, the pulse signal P1 is used as a substitute for the rotation speed signal SFG so as to prevent the execution of the abnormality detection. When the rotation speed signal SFG is not supplied due to the short circuit or disconnection of the lines, the pulse signal P1 is not used, so that the abnormality detection is executed by the rotation speed signal SFG which indicates the abnormality of the cooling fan 4. With this configuration, in a vehicular lamp in which a cooling fan is intentionally stopped as a matter of controlling, when even a light source module 2 is lit, an accurate abnormality detecting operation can be realized.

Thus, while the first to sixth embodiments have been described, these embodiments only illustrate the examples of the invention, and hence, more various specific configurations can be considered for the vehicular lamp of the invention.

What is claimed is:
1. A vehicular lamp comprising:
a light source;
a cooling fan configured to cool the light source;
a light source power supply module configured to drive the light source for emission of light; and
a control module configured to execute an abnormal rotation detection of the cooling fan and to control the light source power supply module so that the quantity of light emitted from the light source is reduced in response to a detection of abnormal rotation, wherein when detecting an abnormal rotation of the cooling fan, the control module controls the light source power supply module so that the quantity of light emitted from the light source module is reduced in accordance with a rotation speed of the cooling fan, the control module changes a determination threshold which is used to detect an abnormal rotation of the cooling fan in accordance with information on a driving current which is supplied to the light source by the light source power supply module, and when the driving current is low, the determination threshold is set to a lower value.

2. The vehicular lamp according to claim 1, wherein
when detecting an abnormal rotation of the cooling fan, the control module controls the light source power supply module so that the quantity of light emitted from the light source is reduced gradually.

3. The vehicular lamp according to claim 1, wherein
the control module performs the abnormal rotation detection based on a rotation speed signal from the cooling fan and generates a substitute rotation speed signal which indicates a normal rotation speed, and when the input of the rotation speed signal is interrupted by a predetermined cause, the control module performs the abnormal rotation detection by using the substitute rotation speed signal as a substitute for the rotation speed signal from the cooling fan, preventing the interruption of the rotation speed signal from being detected as an abnormal rotation.

4. The vehicular lamp according to claim 1, wherein
the control module performs the abnormal rotation detection based on a rotation speed signal from the cooling fan, the control module sets a predetermined period since activation of the cooling fan as a mask period during which the abnormal rotation detection based on the rotation speed signal is not performed, and the control module determines that the abnormal rotation occurs in the cooling fan when a state corresponding to an abnormal rotation continues for a predetermined length of time in the rotation speed signal in other periods than the mask period.

5. The vehicular lamp according to claim 1, wherein
the control module changes a determination threshold which is used to detect an abnormal rotation of the cooling fan in accordance with temperature information.

6. The vehicular lamp according to claim 1, wherein the quantity of light emitted from the light source module is reduced at a degree at which a cooling capability of the cooling fan lowers.

7. The vehicular lamp according to claim 1, wherein the determination threshold is compared to a detected value of the rotation speed of the cooling fan.

* * * * *